United States Patent
Di-Cairano-Gilfedder et al.

(10) Patent No.: US 10,887,172 B2
(45) Date of Patent: Jan. 5, 2021

(54) NETWORK FUNCTION VIRTUALIZATION

(71) Applicant: BRITISH TELECOMMUNICATIONS PUBLIC LIMITED COMPANY, London (GB)

(72) Inventors: Carla Di-Cairano-Gilfedder, London (GB); Sid Shakya, London (GB); Gilbert Owusu, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 119 days.

(21) Appl. No.: 15/745,763

(22) PCT Filed: Jun. 22, 2016

(86) PCT No.: PCT/EP2016/064386
§ 371 (c)(1),
(2) Date: Jan. 18, 2018

(87) PCT Pub. No.: WO2017/016758
PCT Pub. Date: Feb. 2, 2017

(65) Prior Publication Data
US 2018/0219735 A1    Aug. 2, 2018

(30) Foreign Application Priority Data
Jul. 28, 2015 (EP) ..................... 15178679

(51) Int. Cl.
*H04L 12/24* (2006.01)
*H04L 12/26* (2006.01)

(52) U.S. Cl.
CPC ...... *H04L 41/0823* (2013.01); *H04L 41/0896* (2013.01); *H04L 41/145* (2013.01);
(Continued)

(58) Field of Classification Search
None
See application file for complete search history.

(56) References Cited

U.S. PATENT DOCUMENTS 9,032,077 B1    5/2015 Klein et al.
9,806,979 B1 *  10/2017 Felstaine ............ G06F 11/2002
(Continued)

FOREIGN PATENT DOCUMENTS

EP    1 744 571    1/2007
EP    2 635 083    9/2013
(Continued)

OTHER PUBLICATIONS

International Search Report for PCT/EP2016/064386, dated Sep. 19, 2016, 2 pages.
(Continued)

*Primary Examiner* — Gregory B Sefcheck
*Assistant Examiner* — Amarnauth G Persaud
(74) *Attorney, Agent, or Firm* — Nixon & Vanderhye PC

(57) ABSTRACT

An optimum configuration of resources in a network function virtualisation data network is identified by assembling candidate configurations of resources (243), each configuration being an arrangement of the resources into clusters selected such that each cluster provides one or more required services, (212, 213) and assessing the candidate configurations (step 400) to identify an optimum configuration, the assessment of each configuration including measurement of latency (195) in physical links between the resources and, for each candidate configuration, determination of the total latency between the resources within each cluster of the configuration, for a predicted level and pattern of traffic associated with the required service to be operated by each cluster.

17 Claims, 5 Drawing Sheets

(52) U.S. Cl.
CPC ............ *H04L 41/147* (2013.01); *H04L 41/16* (2013.01); *H04L 41/5025* (2013.01); *H04L 43/08* (2013.01); *H04L 43/0852* (2013.01)

(56) References Cited

U.S. PATENT DOCUMENTS

| | | | |
|---|---|---|---|
| 2005/0278453 A1* | 12/2005 | Cherkasova | ...... H04L 29/06027 709/231 |
| 2007/0050492 A1 | 3/2007 | Jorgensen | |
| 2010/0199267 A1 | 8/2010 | Rolia et al. | |
| 2012/0136971 A1* | 5/2012 | Cherkasova | .......... H04L 41/145 709/219 |
| 2012/0324071 A1 | 12/2012 | Gulati et al. | |
| 2013/0215789 A1* | 8/2013 | Lim | ......... H04L 45/04 370/254 |
| 2015/0058473 A1 | 2/2015 | Grande | |
| 2015/0063166 A1 | 3/2015 | Sif et al. | |
| 2015/0135185 A1* | 5/2015 | Sirota | ................ G06F 9/5011 718/103 |
| 2016/0119197 A1* | 4/2016 | Lee | ......... H04L 67/10 709/226 |
| 2016/0157042 A1* | 6/2016 | Brisebois | ............ H04L 41/0893 455/418 |
| 2016/0182397 A1* | 6/2016 | McFarlin | .............. G06F 9/5061 709/226 |
| 2016/0191370 A1* | 6/2016 | Wood | ..................... H04L 41/12 370/238 |
| 2016/0205018 A1* | 7/2016 | Li | .......................... H04L 45/021 370/392 |
| 2016/0353465 A1* | 12/2016 | Vrzic | ................ H04W 28/0247 |
| 2017/0244808 A1* | 8/2017 | Sala | .................... H04L 41/0813 |

FOREIGN PATENT DOCUMENTS

| | | |
|---|---|---|
| EP | 2 731 021 | 5/2014 |
| WO | WO 2013/177246 | 11/2013 |
| WO | WO 2014/121968 | 8/2014 |
| WO | WO 2015/070189 | 5/2015 |

OTHER PUBLICATIONS

Search Report issued in Application No. GB1513284.8, dated Feb. 11, 2016 (2 pages).

Luizelli, et al., "Piecing Together the NFV Provisioning Puzzle: Efficient Placement and Chaining of Virtual Network Functions", 2015 IFIP/IEEE International Symposium on Integrated Network Management (IM), Ottawa, May 2015, pub. IEEE, (9 pages).

Martini, et al. "Latency-aware Composition of Virtual Functions in 5G", 2015 IEEE Conference on Network Softwarization (NetSoft), London, Apr. 2015, pub. IEEE, US, ISBN 978-1-4799-7899-1 (6 pages).

A. Mohamed, H. Hagras, S. Shakya and G. Owusu, "A fuzzy-genetic tactical resource planner for workforce allocation," 2013 IEEE Conference on Evolving and Adaptive Intelligent Systems (EAIS), Singapore, 2013, pp. 98-105, doi: 10.1109/EAIS.2013.6604111.

* cited by examiner

NETWORK FUNCTION VIRTUALIZATION

This application is the U.S. national phase of International Application No. PCT/EP2016/064386 filed 22 Jun. 2016, which designated the U.S. and claims priority to EP Patent Application No. 15178679.5 filed 28 Jul. 2015, the entire contents of each of which are hereby incorporated by reference.

BACKGROUND AND SUMMARY

This invention relates to resource provisioning in Network Function Virtualisation. Network Function Virtualisation (NFV) is a novel network architecture paradigm that uses information technology and related technologies to enable network and service providers to flexibly instantiate network functions and services by means of configurable software, allowing virtual networks and virtual machines to be instantiated on ubiquitous commodity hardware, rather than expensive proprietary hardware. It allows increased flexibility, efficiency, and scalability of networks and services while at the same time providing substantial cost savings to providers as commodity hardware is available at a fraction of the cost of traditionally-used dedicated hardware.

The principle of the virtualisation is achieved by defining and assigning a "service chain", which is a set of physical resources (e.g. servers, routers) which are grouped ("chained") together to deliver a given functionality such as for example firewall functions, routing functions, and Wide Area Network (WAN) acceleration functions.

Algorithms are being developed that seek to optimise the selection of the virtual functions, and the network elements to perform them, to form each chain, and to optimise the provisioning of resources to provide those services, so as to meet operational requirements within specific resource constraints.

Depending on the type of service or functions, such chaining engines may use different types of optimisation algorithms, for example function placement may seek balanced usage of physical resources, or maximum utilisations or may seek optimisation of service performance or a combination of objectives. The physical elements may have different locations, in which case, communication between them may have an effect on performance. Most chaining processes are designed to resolve a predetermined set of service demands for the virtualised services. If demand patterns change, the existing chaining may no longer be optimal.

A prior art system is disclosed in U.S. Pat. No. 9,032,077, which allows bandwidth or other resources to be allocated in a network in response to a request from a client for a service. It does this by assessing the resources currently available, and assigning resources in real time to meet a specific demand from the client. However, this ad-hoc approach can lead to sub-optimal allocations of resources for subsequent requirements, particularly as the utilisation of system approaches its maximum capacity, when further client requirements have to be met from whatever resources remain available. Reallocating the resources used by a particular application "on the fly", in the middle of a session, is difficult and can result in the session being dropped.

According to a first aspect of the invention, there is provided a method of optimising resource allocation in a network function virtualisation data network by:
generating a forecast of services predicted to be required to be provided by the network to a plurality of clients,
assembling candidate configurations of resources, each configuration being an arrangement of the resources into clusters selected such that each cluster provides one or more services projected to be required by the clients, and
assessing the candidate configurations to identify an optimum configuration, the assessment of each configuration including
measurement of latency in physical links between the resources and, for each candidate configuration,
determination of the total latency between the resources within each cluster of the configuration, for a predicted level and pattern of traffic associated with the required service to be operated by each cluster.

According to a second aspect, the invention provides Apparatus for controlling a network function virtualisation data network, the apparatus comprising
a network service demand forecasting system, for calculating a predicted demand level from a plurality of clients for each of a plurality of network services;
a function demand management system configured to respond to an input from the network service demand forecasting system by assembling candidate network configurations based on a mapping of services to network functions, each configuration being an arrangement of the resources into clusters selected such that each cluster provides one or more services forecast to be required by the clients, and
an optimisation processor to assess the candidate configurations to identify an optimum configuration, the assessment of each configuration including measurement of latency in physical links between the resources and, for each candidate configuration, determination of the total delay to be caused by the measured values of latency, for the predicted level of traffic between the resources in each cluster,
and an output system for controlling the network resources to be configured into the optimum identified configuration.

Preferably, a plurality of candidate configurations are generated by
selecting the resources required to meet a basic service demand,
determining demand for an additional function set to be associated with the basic demand, and
identifying, from the candidate configurations so identified, an optimum configuration to meet the demand criteria.

The plurality of candidate configurations may be generated by a genetic algorithm process.

If an existing configuration is to be assessed for reconfiguration, an optimum configuration may be identified by selecting a configuration according to the amount of modification and associated cost required to transform the existing configuration to the selected configuration.

In a preferred embodiment, a plurality of candidate configurations are each assessed to identify their fitness to meet the required services, and the amount of modification required to transform the existing configuration to the candidate configuration, and a configuration is selected from the candidate configurations, according to their fitness scores and modification requirements.

An optimum candidate configuration may be identified according to a first property, and other near-optimum candidate configurations then identified having a value of the first property within a predetermined value of the optimum value, and a candidate configuration selected for reconfiguration of the resources, the selected configuration being selected from the configurations identified as being within a predetermined value of the optimum value of the first property, and having an optimum value of a second property. The first and second properties may be the fitness function and the modification requirement cost.

By taking into account the expected demand for the services, embodiments of the present invention provide an optimisation process which seeks to maximise service coverage and utilisation of resources in each cluster. This allows the optimisation process to cluster the virtual resources required to deliver such services, to achieve maximisation of service coverage and utilisation of resources while at the same time minimising delay between physical resources as well as, in a preferred arrangement, utilisation variance across clusters. It also supports service performance optimisation with benefits for its SLA-bound services Geographical optimisation can be based on standard artificial intelligence (AI) techniques, such as clustering and search heuristics. Such AI techniques generally start by creating a set of random service chain clusters and iteratively evaluating and refining them to "evolve" to better structures where the evolution is driven by a fitness function.

The performance characteristics of the obtained optimal cluster can then be evaluated, and upgrades can be triggered in case of insufficient resources. This mechanism supports service provisioning, and performance optimisation, with benefits for services subject to service-level agreements and virtual function chaining where the order of functions instantiation matter.

BRIEF DESCRIPTION OF THE DRAWINGS

An embodiment of the invention will now be described, with reference to the drawings, in which.

DETAILED DESCRIPTION OF PRESENT EXAMPLE EMBODIMENTS

This embodiment is a mechanism for resource provisioning in a Network Function Virtualised network, arranged to optimise the chaining geographically. Based on the expected services' demand, the mechanism applies an optimisation process that clusters the virtual resources required to deliver such services. The optimisation seeks maximisation of service coverage and utilisation of chained resources while at the same time seeks minimisation of delay between physical resources as well as utilisation variance across clusters. The performance characteristics of the obtained optimal cluster are then evaluated and upgrades triggered in case of insufficient resources.

Figure 1:
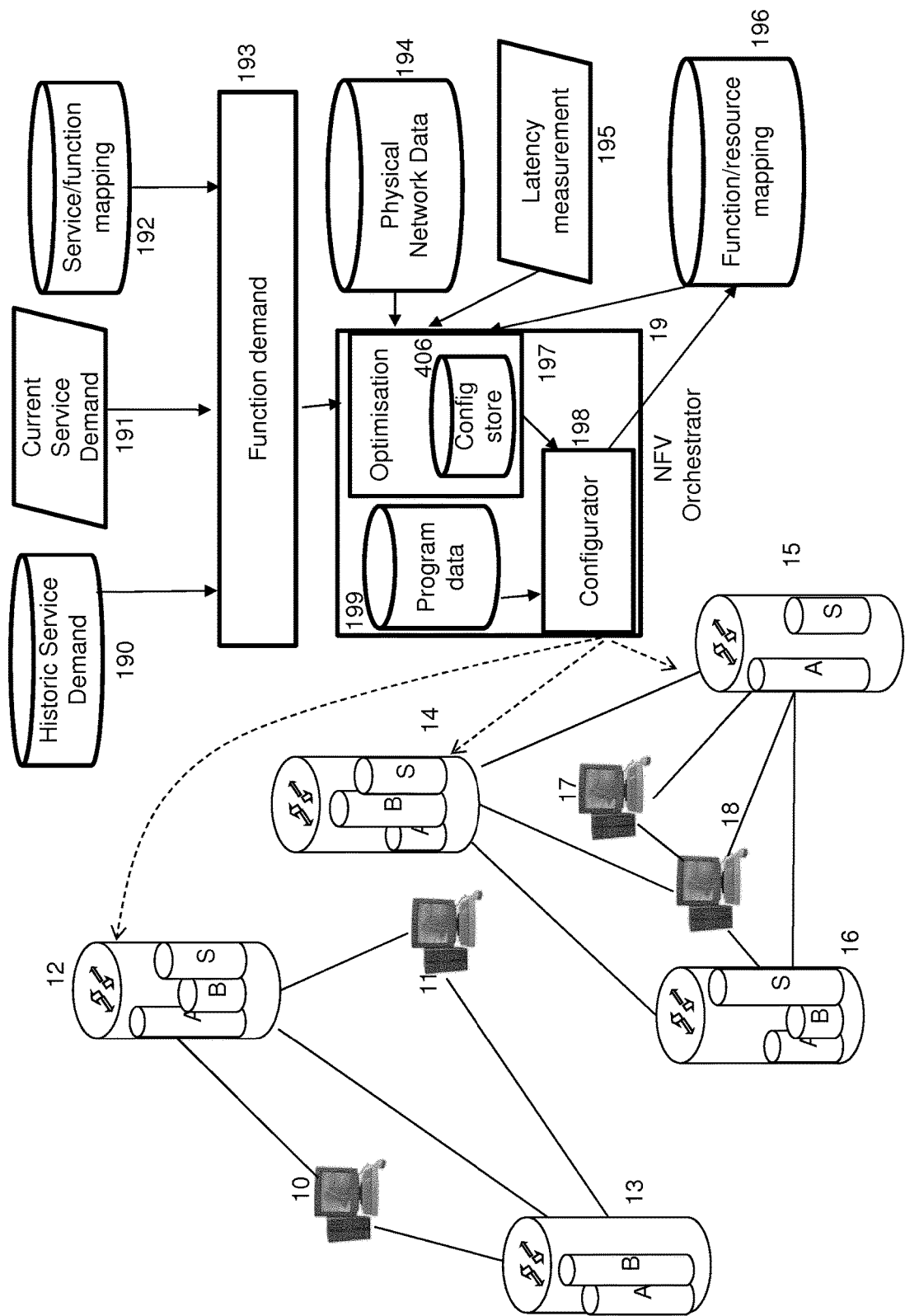
FIG. 1 is an illustration of a simplified network of resources illustrating the principles of chaining with regard to service demand and geographical considerations.

This mechanism can support a service provider's resource provisioning and planning, to be used at timescales, typically of the order of a few weeks or months, but may be shorter depending on the volatility of service demand and resources. As a way of an example, a service provider may need to support a content streaming service that may require two functions such as routing and WAN acceleration, and may also need to support firewall and routing for a private network. These functions are virtualised and can be instantiated from a range of physical locations. The service provider needs a mechanism to optimally cluster its resources based on its services' demand and resource availability. The present invention groups resources in clusters over which an NFV orchestrator will instantiate virtual functions necessary to meet demand for services by means of low-level management and data protocols As shown in FIG. 1, a number of physical resources 10, 11, 12, 13, 14, 15, 16, 17, 18 are depicted. Some of these resources 10, 11, 17, 18 have specific functions, whilst the remaining resources 12, 13, 14, 15, 16 can be configured to perform functions required to meet demand for different services, identified as A, B, and S. The capacity to meet each service varies from one resource to another, as indicated by the varying lengths of the columns in FIG. 1. As can be seen, not all services can be mapped to all resources.

The purpose of "chaining" is to group the resources to meet the demand for the services they can provide. FIG. 1 depicts the various resources arranged into two chains 10, 11, 12, 13 and 14, 15, 16, 17, 18. The embodiment aims to optimise the organisation of these chains such that the elements can co-operate in the most efficient way possible. As depicted schematically in FIG. 1, the optimisation process is performed by a network orchestrator 19 which has an optimisation processor 197 to run the optimisation process, and a configuration processor 198 to control the individual network elements to perform the functions selected by the optimisation process, including where necessary download to the network elements 10, 11, . . . 18 of any programme data 199 needed to instantiate the functions allocated to them. (For the sake of clarity not all control connections are shown in FIG. 1)

Input variables for the optimisation processor 197 include a historical resource and demand profile 190 and constraints in the planning horizon such as:

Demand for each service 191 (e.g. service request rate received from users),

Physical resource location and capacity 194 (e.g. CPU demand or memory demand)

Latency between physical locations 195

Functions necessary to provide each service 192. These functions are categorised as Baseline functions and Additional functions:

"Baseline functions" are defined as the minimum enabling virtual functions to provide a service, while "Additional functions" are add-on functions which operate in conjunction with the baseline functions and are optional for a customer. For example an enhanced streaming service may have three component functions: routing, WAN acceleration, and DPI (deep packet inspection, a filtering operation). The streaming service cannot operate without routing, so that is defined as "enabling" the service and interpreted as the service's Baseline function. WAN acceleration and DPI are both concerned with enhancing the quality of a service that requires routing as the enabler function, so they are both considered as "Additional" functions for the service.

More specifically the assumptions with regards to service demand are as follows.

Given a set R of service types r supported by the service provider, then, for each service type r:

let $Y^r_1, \ldots, Y^r_n$ be the (virtual) functional components necessary to provide the service r let $S^r_1, \ldots, S^r_m$ be the physical resources where functional components $Y^r_1, \ldots, Y^r_n$, needed to deliver service r, are available (e.g. servers where specific software has been installed).

Figure 2:
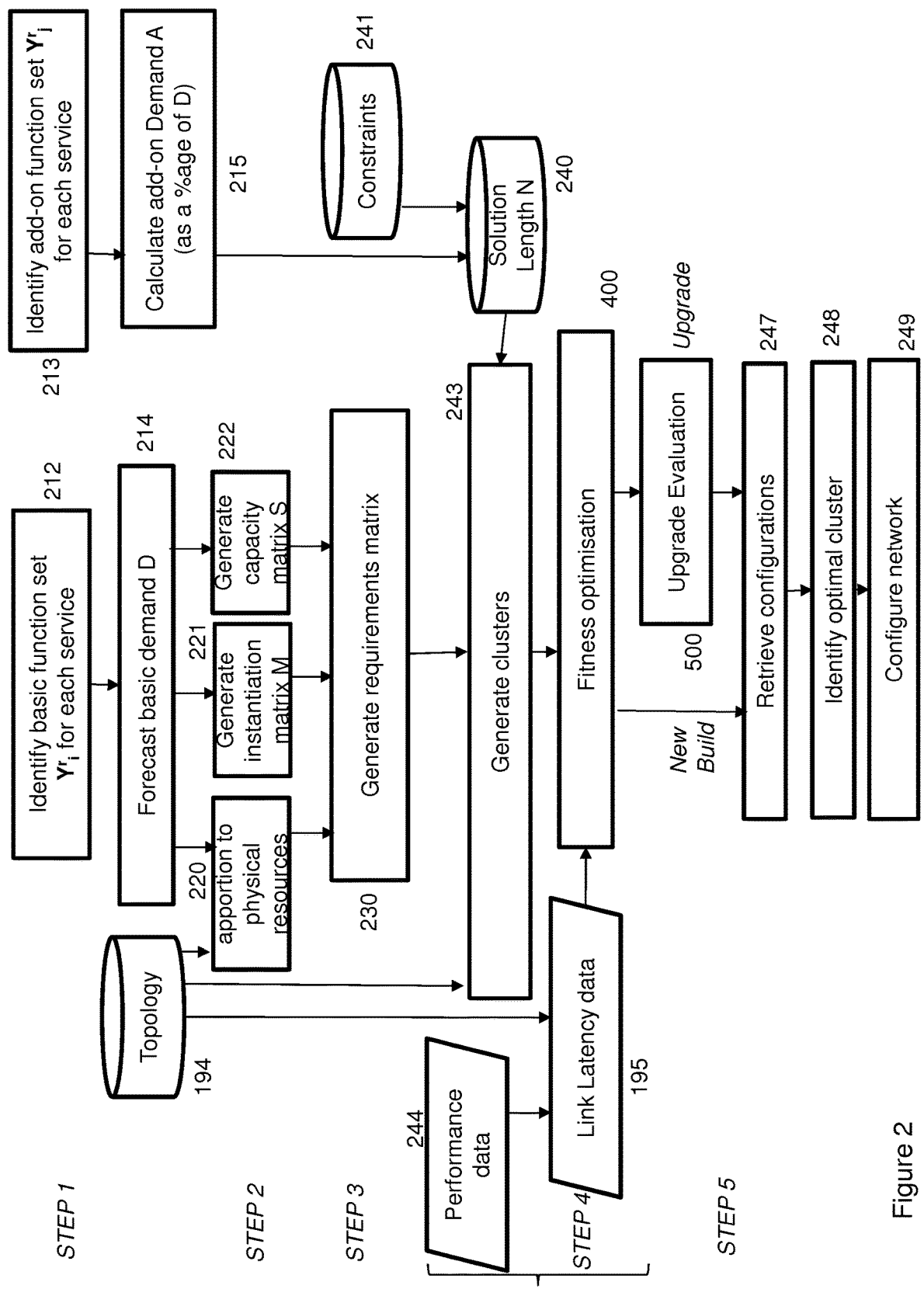
FIG. 2 is a flow chart illustrating the process operated by this embodiment.

The process performed in this embodiment of the invention has four principal stages, as depicted in FIG. 2. FIG. 2 also depicts an additional stage that is used when an existing configuration is to be assessed for revised demand levels.

The first stage is to generate a forecast of service demand (steps 212-215). First a set of baseline/minimum enabling virtual functions $Y^r_i$ (step 212) and Additional virtual functions $Y^r_j$, (step 213) are identified for each service type r in R. These are maintained in the service/function mapping 192. Then forecasts are produced by the function demand processor 193 for both types of functionalities (step 214, 215), using data received from actual service requests from customers (input 191) and forecasts based on historic data (190).

A baseline demand forecast (denoted by D) is produced in terms of an estimated number of service requests in the planning horizon (e.g. average number of service requests per time units). In this simplified model, the clustering assumes provision for a single value based on the average daily demand, although in practice demand will vary over the period. This forecast provides the count of service requests (derived from the request input 191 and historic data 190); this level of demand is then converted into actual requirements on physical resources, as will be discussed with reference to Table 1 below.

Demand A for the additional functionality set $Y^r_j$, (the functions previously identified at step 213), is also determined (step 215). This demand can be met by means of functions instantiated on potentially different physical locations, which are identified by the clustering optimisation process to be described later. In this embodiment the additional functionality demand is expressed as a function of the baseline demand, for example it may be expressed as a percentage $f^r_j$ of the forecasted baseline demand D.

In the second stage, virtual functions are mapped to the physical resources. The optimisation processor 197 first attempts to apportion the baseline demand D to physical resources which can instantiate such minimum functionality (step 220). These would normally be chosen to be in geographical proximity to the demand origin, e.g. local exchanges of broadband customers, enterprises' main switching/routing sites, which are identified using the physical network data 194.

In general there will be insufficient existing resources to meet the current demand pattern, and the following optimisation process is then used to cluster additional physical resources in order to support the total baseline demand and add-on demand.

For each service type r in R, the mechanism maintains the matrix M depicted in Table 1 (step 221).

TABLE 1

Network functions instantiation table M

| Service r -<br>virtual function<br>(VF) | $S^r_1$ | $S^r_2$ | | $S^r_m$ |
|---|---|---|---|---|
| VF $Y^r_1$ | 1 | 0 | | 1 |
| ... | ... | ... | ... | ... |
| VF $Y^r_q$ | 0 | 1 | | 1 |

This matrix contains details of the virtual functions VF necessary for the service r and whether this can instantiated at physical resource $S^r_i$ (matrix contains value 1 for yes, 0 for no).

In addition, for all physical locations $S_1, \ldots, S_n$ the process maintains the matrix depicted in Table 2 containing details of maximum capacity for metrics $M_1, \ldots, M_s$ (e.g. CPU memory) (step 222)

TABLE 2

Physical locations' maximum capacity table

| | $M_1$ | $M_2$ | | Ms |
|---|---|---|---|---|
| $S_1$ | $C_{11}$ | $C_{12}$ | | $C_{1s}$ |
| ... | ... | ... | ... | ... |
| $S_n$ | $C_{1n}$ | $C_{2n}$ | | $C_{sn}$ |

The third stage in the process identifies service requirement factors for each of the virtual functions it supports, as detailed in Table 3 (step 230).

TABLE 3

Virtual functions unit requirements for each metric

| | $M_1$ | $M_2$ | | Ms |
|---|---|---|---|---|
| VF $Y_1$ | $F_{11}$ | $F_{12}$ | | $F_{1s}$ |
| ... | ... | ... | ... | ... |
| VF $Y_q$ | $F_{q1}$ | $F_{q2}$ | | $F_{qs}$ |

For each virtualised function the matrix contains its unit requirement in terms of each metric $M^r_i$ by which it is measured, such as CPU, memory, or Request handling rate.

This table is used to translate forecast numerical demand to actual resources' demand. In one embodiment these factors would be multiplicative, for example if $Y_1$ is a routing function and metric $M_1$ is CPU memory then, if the forecast is 1,000 routing function requests (per time unit) then $1000*F_{11}$ will be its requirements in terms of CPU memory.

Figure 4:
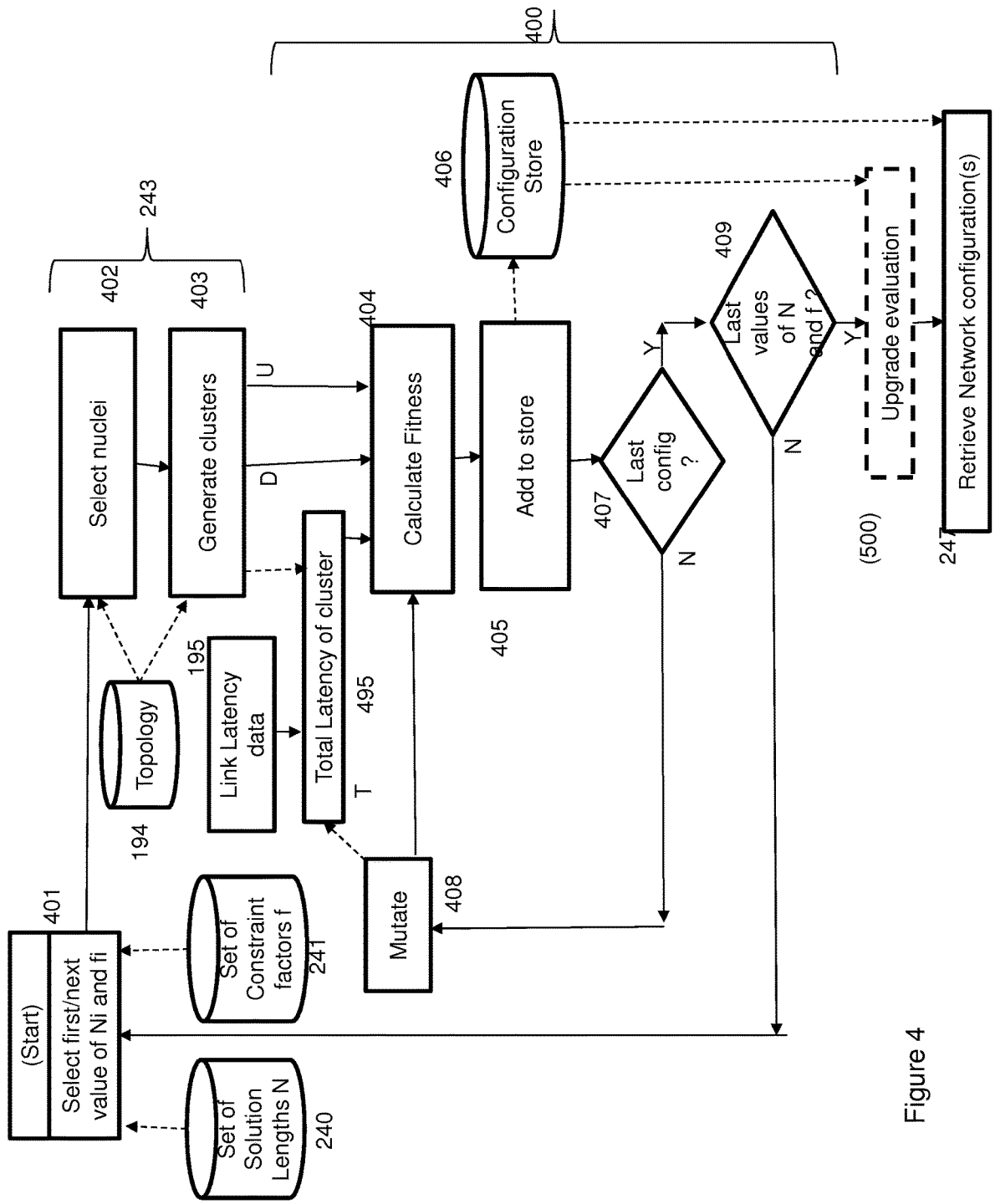
FIG. 4 is a flow chart illustrating in more detail the steps of the process depicted in FIG. 2 that relate to the identification of an optimal cluster configuration.

The fourth stage in the process is a generation of a number of possible candidate cluster arrangements (step 243) and an optimisation process (step 400) to identify the most suitable clustering arrangement, as depicted in more detail in FIG. 4. The optimisation is performed to subject to a set of predetermined constraints maintained in the store 241.

One variable in this process is the number of clusters to be formed. The first step in the cluster generation process 243 is therefore to set a solution Length (N), that is to say, the number of geographical clusters to be formed. The solution lengths to be tested are maintained in a store 240. We will define a set $/N/=\{N_1, \ldots, N_c\}$ of possible cluster sizes

TABLE 4

Cluster definition

| 1 | 2 | ... | i | i + 1 | ... | N |
|---|---|---|---|---|---|---|

For each cluster size N in the set /N/ a number of physical locations i (=1, ... N) are selected from the network topology 194 (step 401, FIG. 4) and interpreted as the centres of the clusters (step 402). It should be understood that the centres are not "master nodes" in any way controlling the rest of the cluster, but are just used as a nucleus or seed around which the cluster will develop. Its location in relation to the other elements of the resulting cluster will depend on the (random) distribution of the nodes selected as seeds.

Figure 3:
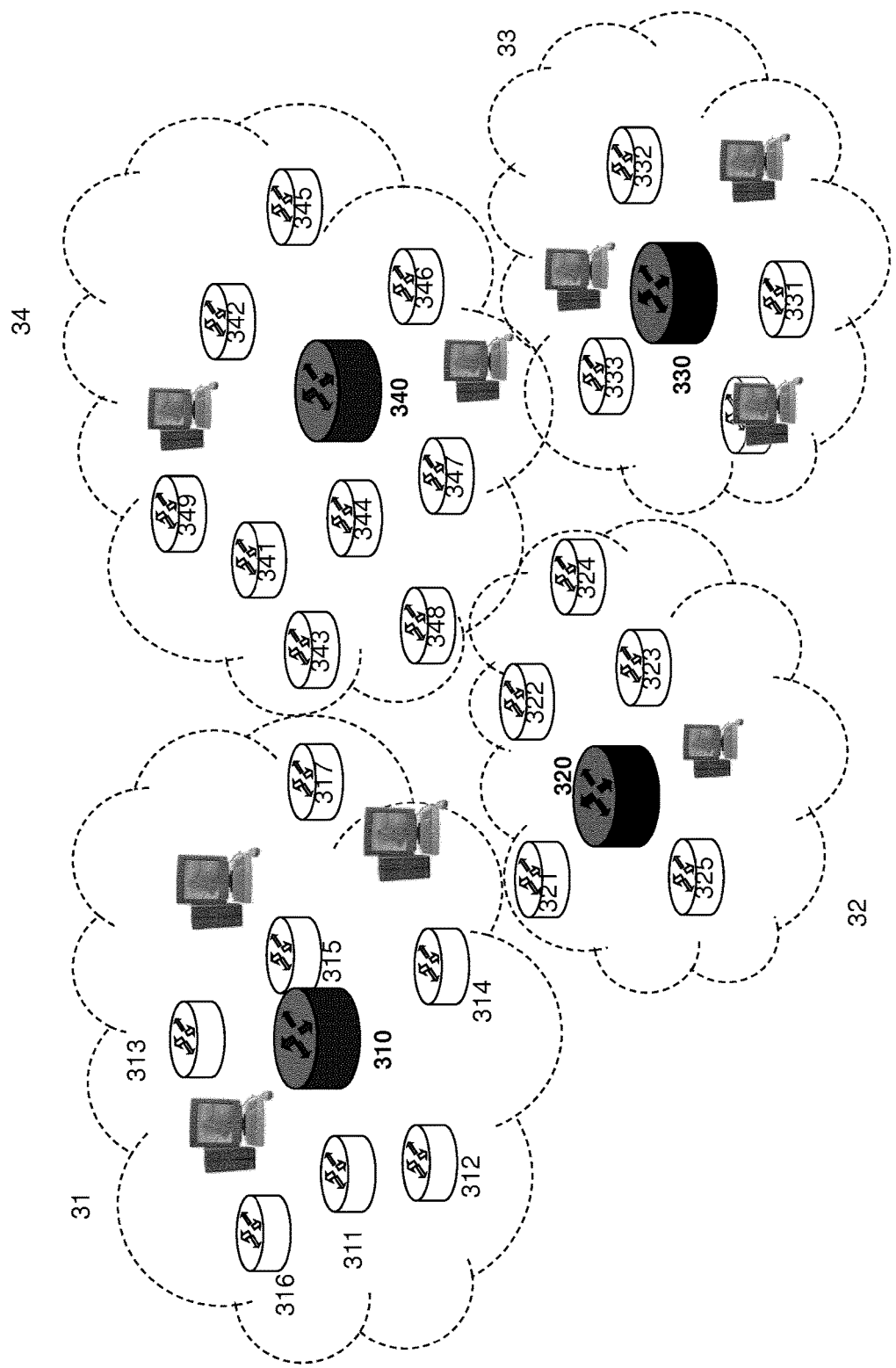
FIG. 3 is an illustration of a geographically-based clustering configuration.

A cluster set C(N, H)={$C_1, C_2, \ldots, C_N$} is then created (step 403) by adding closest physical locations to each central point. As depicted in FIG. 3, the cluster creation process depends upon the value of N and on an adjustment factor $f_s$ ($0<f_s\leq 1$) retrieved from a set of values H (241), which is used to constrain utilisation levels.

FIG. 3 depicts, as an illustrative example, four clusters 31, 32, 33, 34, each with a respective nucleus 310, 320, 330, 340, and other locations 311-317, 321-325, 331-333, 341-349. The clustering process is subject to the constraint that if the cluster $C_i$ in C(N, H) contains physical locations $S_1 \ldots S_q$ then their total capacity $\Sigma_q K_i$ per each metric $M_i$ with i=1, . . . , s can support the total baseline service demand D and the additional functionality demand A per each metrics assigned to such locations, as detailed in Table 5.

TABLE 5

Cluster capacity vs demand

| Cluster capacity versus demand | $M_1$ | $M_2$ | Ms |
|---|---|---|---|
| $S_1, \ldots, S_q$ | $\Sigma q(D_1 + A_1) \leq$ $f_1 * \Sigma q TC_1$ | $\Sigma q(D_2 + A_2) \leq$ $f_2 * \Sigma q TC_2$ | $\Sigma q(D_s + A_s) \leq$ $f_s * \Sigma q TC_s$ |

In Table 5, service demands are constrained to be less than an upper bound given by total resources $\Sigma_q K_i$ available in $S_1 \ldots S_q$ in terms of metrics $M_i$ with i=1, . . . , s adjusted by a factor $f_s$ in H={$f_1, \ldots, f_s$} with factors $f_s$ such that $0<f_s\leq 1$. These adjustment factors can be used to constrain utilisation below certain levels, however such constraints may prove restrictive and limit the solution space, hence the optimisation process in this embodiment allows $f_s$ to vary, allowing utilisation constraints to vary and expose the result for subsequent optimisation process—known as "externalising", as described later. The process is therefore iterated for various cluster numbers N and adjustment factors fin the set H (steps 409, 401).

Note that a cluster may contain physical locations where functions can be instantiated but do not have associated baseline service demand, as depicted in FIG. 1 (zero demand levels S and B in nodes 13, 15 respectively).

The criteria set out in Table 5 above ensure that the resources are sufficient to meet demand.

In this embodiment, an iterative genetic algorithm process 400 is used to identify an optimum configuration for each cluster/factor combination. This is done by performance of a fitness function 404 on a configuration, and then modifying ("mutating") that configuration (step 408) a number of times, and assessing the fitness of the mutated configurations, in order to identify the optimum configuration which is recorded (step 406). This process is then repeated for different values of N and f (step 409, 401) The fitness assessment step 404 used to optimise this clustering process takes into account all the factors in, and constraints that can have effect on, defining efficient geographical clustering of a service chain, and determines how much of the total resources are utilised for each metric.

The fitness function F(C(N, H)), which the optimisation process seeks to maximise, is:

$$F(C(N,H))=\Sigma_{Ci}[D(C_i)*U(C_i)]/[K(C_i)*V(C(N,H))]$$

where for each cluster $C_i$, i=1, . . . , N in the cluster set C(N, H)

D(Ci)=$\Sigma$q(Di+Ai) total service demand coverage in cluster Ci, where if cluster Ci consists of sites $S_1, \ldots, S_q$, Di is the forecast for baseline demand physically mapped to all such physical resources—214) and Ai is the forecast demand for additional virtual functionality arising from all physical resources in cluster Ci, as determined by the cluster generation process described above with reference to Table 5).

$$U(Ci)=\text{mean}_s[(\Sigma_q(D_s+A_s))/\Sigma_q K_s]$$

is the mean of the utilisations of the metrics s within cluster Ci, . . . .

V(C(N, H)) is the statistical variance of the distribution of utilisations {$U(C_1), \ldots, U(C_N)$} within the cluster in C(N, H). The minimisation of variance is desirable so as to obtain balanced demand allocation across clusters and avoid bottleneck clusters unable to accommodate unexpected demand well above the average demand provisioned for.

K(Ci)=f(delay) end-to-end delay is a function of propagation delay over links interconnecting the physical resources in cluster Ci (e.g. average delay). For any network topology, propagation delays are known and independent from traffic loads. Individual link data 195 is retrieved from a network performance monitoring system 244. As the end-to-end delay that services experience also depends upon variable queuing delays (e.g. caused by temporary congestion) and by processing delays in routers or end-system servers, in this embodiment the delay K(Ci) is defined as a function of the propagation delay. The delay may be determined (step 495) by adding or multiplying factors to the propagation delay determined by conventional measurements or heuristics.

By definition of F(C(N, H)) (step 404), the optimisation process will seek to maximise its components D(Ci) and U(Ci), while minimising the variance component V(C(N, H)) in the denominator and the latency K of the configuration under consideration (derived in step 495), weighted by expected utilisation of each cluster in the configuration. Each configuration is stored in a store 406, ranked in order of "fitness" (step 405).

The optimisation process 400 then seeks to improve the fitness function by, for example, applying genetic algorithm techniques such as crossover and mutation operations to the original solution (step 408). This process continues over several iterations until a predetermined condition is met (step 407), such as total number of iterations, or number of iterations since an improvement has been identified.

This process is then repeated with different choices of centre points (step 401), until a predetermined condition is met (step 409), for example all values in the cluster set size /N/={$N_1, N_c$} and combinations of factor sets H={$f_1, \ldots, f_s$} having been tested, with /N/ and H input in step 401. For each choice N of number of clusters and set of factors H, the optimisation 400 identifies clustering and ranks them in order of highest fitness function F(C(N, H)) (406).

Figure 5:
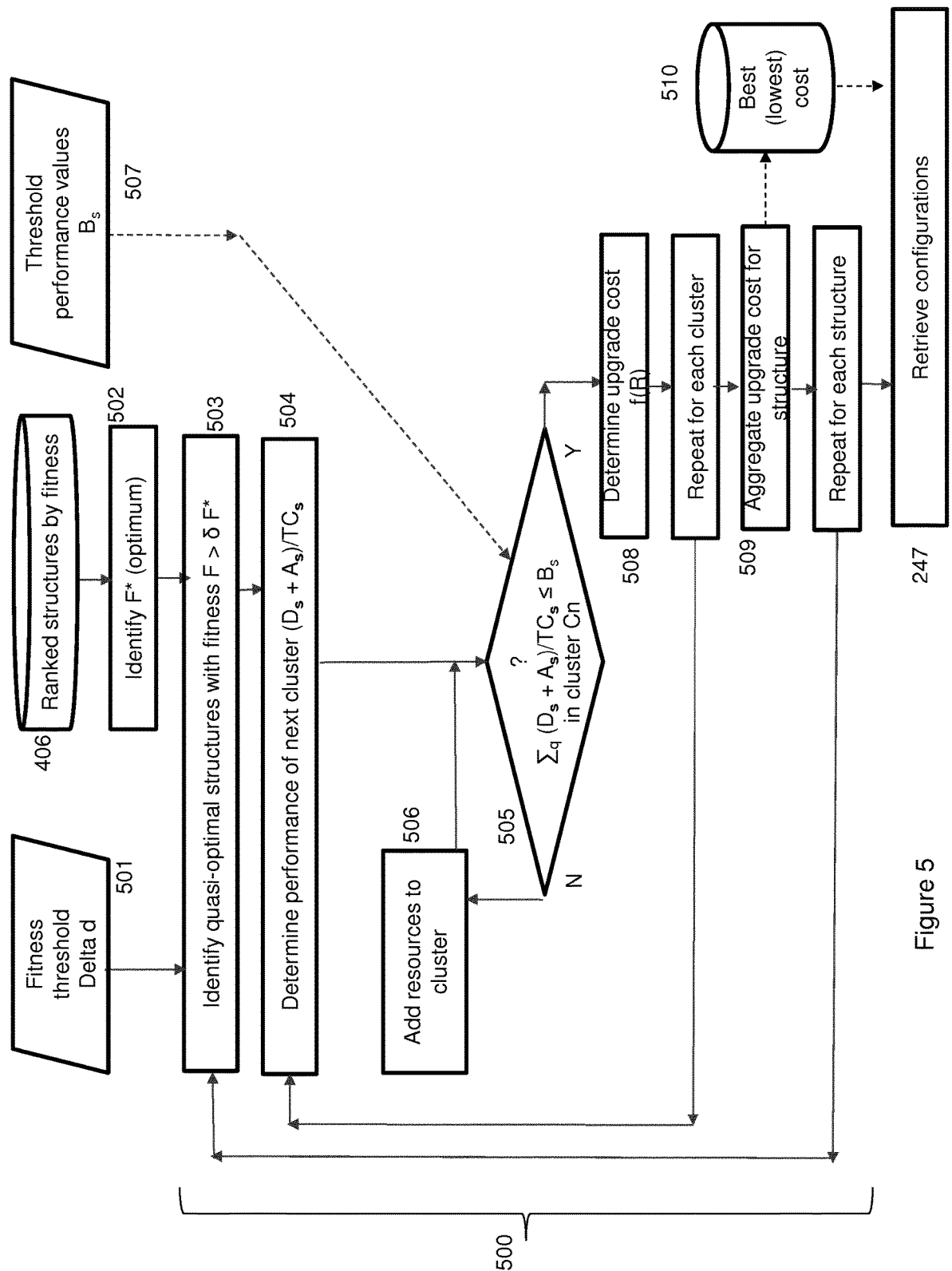
FIG. 5 is a flow chart illustrating in more detail an associated process for reconfiguring an existing cluster structure to meet changes in demand.

After the last iteration, before actual network component configuration, a further evaluation process 500 may take place. This evaluation process 500 (depicted in more detail in FIG. 5) aims to minimise costs associated with revising an existing clustering structure. These costs may be measured in terms of risk of service failure or interruption during, or as a result of, the reconfiguration process, signalling overhead required to download new configuration instructions, or any other quantifiable detriment to the service. There may be a financial cost associated with this detriment, but that is merely a consequence of the physical cost of reconfiguration which is being considered here.

For this purpose the evaluation process 500 identifies not only the optimum structures, but also the quasi-optimal structures which are defined as all those structures whose fitness value is within a tolerance range d of this optimum value—i.e. F>dF*, with 0<d<1 tolerance factor 0<d<1.

In this case the structures are retrieved from the store (406), together with their respective fitness functions F (determined in step 404) and their associated cost of upgrade is determined as follows.

For each quasi-optimal structure, the process 500 next evaluates the expected resource utilisation $(D_s+A_s)/K_s$ (total demand/capacity), of each cluster (step 504) and compares it with a threshold value $B_s$ (step 505).

For any cluster for which resources are determined to be insufficient to meet predetermined performance objectives the potentially required resource upgrades are identified and associated cost is determined. In this embodiment in a service provider's performance objectives are unmet when, within an identified structure, the utilisation of physical resources exceeds given threshold values $B_s$ stored (507) for any each one of the metrics where the threshold values 507 are specified by the user. Specifically if within a structure there exists a cluster Ci, consisting of sites $S_1, \ldots, S_q$ and a metrics such that utilisation for that metric exceeds the performance threshold.

$$\Sigma_q(D_s+A_s)/K_s > B_s$$

For each such cluster Ci identified, the additional resources are added randomly, uniformly or heuristically to existing physical locations within the cluster (step 506) and tested (step 505) in an iterative process until the condition $\Sigma_q(D_s+A_s)/K_s \leq B_s$, is met for all metrics s. For each quasi-optimal clustering structure where upgrades are necessary, the associated upgrade cost f(R) is determined (step 508).

The process 504-509 is performed for all clusters of the structure and the total upgrade cost for the structure then determined (step 509) and stored (510). This is then repeated for all quasi-optimal structures meeting the fitness criterion 503, thus outputting a set of structures, each made up of clusters which meet the performance and fitness criteria, and for which have associated upgrade cost.

For any clusters that already meet the threshold performance value, no modification (and therefore no upgrade cost) is required for that cluster. Likewise if a structure is identified for which none of its clusters require an upgrade to meet the performance threshold, a zero upgrade cost is determined.

Once this evaluation process (500) is completed, the configuration data is retrieved as before from the store 406 (step 247), together with the additional optimum reconfiguration data 510.

The optimum clustering structure is then selected (step 248) as being the quasi-optimal clustering structure recorded in the store 510 which has the smallest upgrade cost f(R) (508). By its definition, this optimal structure will meet performance targets, minimise cost of upgrades and have a fitness function that is within the allowable "delta" margin of the optimum value best F*.

This configuration can then be retrieved from the store 406 and passed to the configuration processor 198 to configure the various network elements (10, 11, 12, . . . etc) in accordance with the optimised arrangement (step 249, FIG. 2). If a network element is not already equipped with the programme data to perform the task it has been assigned, that data can be downloaded from a program store 199 and downloaded to the element (or elements) 10, 11, 12, . . . etc that require it.

It will be noted that the performance targets are expressed in terms of utilisations being within given bounds (e.g. $\Sigma_q(D_s+A_s)/K_s < B_s$) and these are evaluated post-clustering optimisation as opposed to being an integral part of the optimisation process, i.e. with elements of Table 5 being of the form $\Sigma_q(D_1+A_1) < B_s$, as the latter approach would limit the solution space over which the GA process explores and overall may produce a sub-optimal solution as described earlier.

In addition, this externalisation allows implementing more flexible performance evaluations as in an alternative embodiment of the present invention where a service provider's performance objectives are unmet, in cluster Ci, depending on the value of a function of the utilisations of individual metrics s $$G(\Sigma q(D_1+A_1)/K_1, \ldots, \Sigma q(D_s+A_s)/K_s).$$

In the final step, a physical resources upgrade (249) associated with the optimal cluster structure may be triggered via a Capacity Planner and the obtained clustering structure with associated resources is output to the NFV orchestrator for low-level functions instantiations.

The clustering optimisation is carried out periodically using updates to the forecast demand (step 214), the periodicity depending on the length of the planning optimisation horizon. This mechanism can support a service provider's resource provisioning and planning where this horizon is at timescales of the order of a few weeks or months, depending on the volatility of service demand and resources.

The invention claimed is:

1. A method of operating a communications network comprising:
    generating a forecast of predicted service demand for each of a plurality of resource locations in the network;
    assembling candidate arrangements of resource locations within the network into location clusters based on a mapping of services to network functions, each arrangement being an arrangement of resources into location clusters;
    assessing the candidate arrangements to identify an optimum arrangement of resource locations into clusters, given that resources situated in each location cluster are required to meet the predicted service demand associated with the resource locations within the clusters; and
    instantiating virtual network functions over the location clusters to provision services in accordance with the optimum arrangement identified; wherein,
    an existing arrangement is assessed for reconfiguration, and the optimum arrangement is identified by selecting an arrangement according to an amount of modification and associated cost required to transform the existing arrangement to the selected arrangement;
    a plurality of candidate arrangements are each assessed to identify their fitness to meet the predicted service demand, and the amount of modification required to transform the existing arrangement to the candidate arrangement; and
    an arrangement is selected from the candidate arrangements, according to their fitness scores and modification requirements.

2. A method according to claim 1, wherein a plurality of candidate arrangements are generated by:

selecting resource locations required to meet a basic service demand associated with the resource locations, the method further comprising:
determining additional demand for an additional function set to be associated with the basic demand, and
identifying the optimum arrangement to meet the basic and additional demand.

3. A method according to claim 1, in which a plurality of candidate arrangements are generated by a genetic algorithm process.

4. A method according to claim 1, wherein:
an optimum candidate arrangement is identified according to a first property,
other near-optimum candidate arrangements are identified having a value of the first property within a predetermined value of an optimum value, and
a candidate arrangement is selected for reconfiguration of the resources, the selected arrangement being selected from the arrangements identified as being within a predetermined value of the optimum value of the first property, and having an optimum value of a second property.

5. A method according to claim 4, wherein the first property is the fitness function and the second property is a modification cost.

6. The method according to claim 1, wherein the optimum arrangement is identified based on minimization of variance of resource utilization across location clusters.

7. A method according to claim 1 wherein the assessment of each arrangement further comprises measurement of latency in physical links between the resources.

8. Apparatus for controlling a communications network, the apparatus comprising:
a network service demand forecasting system, for calculating a predicted demand level from a plurality of clients for each of a plurality of network services in each of a plurality of resource locations in the network;
a function demand management system configured to respond to an input from the network service demand forecasting system by assembling candidate network arrangements based on a mapping of services to network functions, each arrangement being an arrangement of resources into location clusters;
an optimisation processor to assess the candidate network arrangements to identify an optimum arrangement, given that resources situated in each location cluster are required to meet the predicted demand level associated with the resource locations within the clusters; and
an orchestrator for instantiating virtual network functions over the clusters of resources to provision services in accordance with the optimum arrangement identified; wherein:
the optimisation processor is configured to assess a plurality of candidate arrangements according to an amount of modification and associated cost required to transform an existing arrangement of the network to the selected arrangement;
the optimisation processor is configured to assess each of the plurality of candidate arrangements to identify their fitness to meet the predicted demand level, and the amount of modification required to transform the existing arrangement to the candidate arrangement; and
an arrangement is selected from the candidate network arrangements, according to their fitness scores and modification requirements.

9. The apparatus according to claim 8, wherein the optimisation processor generates a plurality of candidate network arrangements by selecting the resources required to meet a basic service demand, determining additional demand for an additional function set to be associated with the basic demand, and identifying an optimum arrangement to meet the basic and additional demand.

10. The apparatus according to claim 8, in which the optimisation processor generates a plurality of candidate network arrangements by iterative mutations.

11. The apparatus according to claim 8, wherein the optimisation processor is configured to identify an optimum candidate arrangement according to a first property, and to identify other near-optimum candidate arrangements having a value of the first property within a predetermined value of the optimum value, and to identify a candidate arrangement, from those identified as being within a predetermined value of the optimum value of the first property, having an optimum value of a second property.

12. The apparatus according to claim 11, wherein the first property is the fitness function and the second property is a modification cost.

13. The apparatus according to claim 8, wherein the optimum arrangement is identified based on a minimization of variance of resource utilization across location clusters.

14. An apparatus for controlling a communications network, the apparatus comprising: at least one processor configured to:
calculate a predicted demand level from a plurality of clients for each of a plurality of network services in each of a plurality of resource locations in the network;
respond to an input from the network service demand forecasting system by assembling candidate network arrangements based on a mapping of services to network functions, each arrangement being an arrangement of resources into location clusters;
assess the candidate arrangements to identify an optimum arrangement, given that the resources situated in each location cluster are required to meet the predicted demand level associated with the locations within the clusters; and
instantiate virtual network functions over the location clusters to provision services in accordance with the optimum configuration identified; wherein:
an existing arrangement is assessed for reconfiguration, and the optimum arrangement is identified by selecting an arrangement according to an amount of modification and associated cost required to transform the existing arrangement to the selected arrangement;
a plurality of candidate arrangements are each assessed to identify their fitness to meet the predicted service demand, and the amount of modification required to transform the existing arrangement to the candidate arrangement; and
an arrangement is selected from the candidate arrangements, according to their fitness scores and modification requirements.

15. The apparatus according to claim 14, wherein the processor is further configured to identify an optimum candidate configuration according to a first property, and to identify other near-optimum candidate configurations having a value of the first property within a predetermined value of an optimum value, and to identify a candidate configuration, from those identified as being within a predetermined value of the optimum value of the first property, having an optimum value of a second property.

16. A non-transitory computer program product executable by a processor to:

receive a forecast of predicted service demand for each of a plurality of resource locations in a communications network;
assemble candidate arrangements of resource locations within the network into location clusters based on a mapping of services to network functions, each arrangement being an arrangement of resources into location clusters;
assess the candidate arrangements to identify an optimum arrangement of resource locations into clusters, given that resources situated in each location cluster are required to meet the predicted service demand associated with the resource locations within the clusters; and
instantiate virtual network functions over the location clusters to provision services in accordance with the optimum configuration identified; wherein:
an existing arrangement is assessed for reconfiguration, and the optimum arrangement is identified by selecting an arrangement according to an amount of modification and associated cost required to transform the existing arrangement to the selected arrangement;
a plurality of candidate arrangements are each assessed to identify their fitness to meet the predicted service demand, and the amount of modification required to transform the existing arrangement to the candidate arrangement, and
an arrangement is selected from the candidate arrangements, according to their fitness scores and modification requirements.

17. An apparatus for controlling a network function virtualization data network, the apparatus comprising: at least one processor configured to:
calculate a predicted demand level from a plurality of clients for each of a plurality of network services;
respond to an input from the network service demand forecasting system by assembling candidate network configurations based on a mapping of services to network functions, each configuration being an arrangement of the resources into clusters selected such that each cluster provides one or more services forecast to be required by the clients, and
assess the candidate configurations to identify an optimum configuration, the assessment of each configuration including measurement of latency in physical links between the resources and, for each candidate configuration, determine the total delay to be caused by the measured values of latency, for the predicted level of traffic between the resources in each cluster, and
control the network resources to be configured into the optimum identified configuration,
wherein the processor is further configured to identify an optimum candidate configuration according to a first property, and to identify other near-optimum candidate configurations having a value of the first property within a predetermined value of an optimum value, and to identify a candidate configuration, from those identified as being within a predetermined value of the optimum value of the first property, having an optimum value of a second property.

* * * * *